United States Patent [19]

Grubbs et al.

[11] 4,127,601
[45] Nov. 28, 1978

[54] α-SUBSTITUTED VINYL MENTHYL CARBONATES

[75] Inventors: Harvey J. Grubbs, Mechanicsville; Thomas V. Van Auken; William R. Johnson, Jr., both of Richmond, all of Va.

[73] Assignee: Philip Morris, Incorporated, New York, N.Y.

[21] Appl. No.: 730,951

[22] Filed: Oct. 8, 1976

Related U.S. Application Data

[62] Division of Ser. No. 624,900, Oct. 22, 1975, abandoned.

[51] Int. Cl.² .............................................. C07C 69/96
[52] U.S. Cl. ..................................... 260/463; 526/72
[58] Field of Search ......................................... 260/463

[56] References Cited

U.S. PATENT DOCUMENTS

| | | | |
|---|---|---|---|
| 3,306,880 | 2/1967 | Lee | 260/463 |
| 3,312,226 | 4/1967 | Bauley et al. | 260/463 |
| 3,332,428 | 7/1967 | Mold et al. | 260/463 |
| 3,419,543 | 12/1968 | Mold et al. | 260/463 |
| 3,499,452 | 3/1970 | Kallianos et al. | 260/463 |
| 3,887,603 | 6/1975 | Rundberg et al. | 260/463 |
| 4,033,993 | 7/1977 | Bruns et al. | 260/463 |

OTHER PUBLICATIONS

Bodrikov, I. V. et al., Chemical Abstracts, 80:70393f, (1974).

Primary Examiner—Lewis Gotts
Assistant Examiner—Molly C. Eakin
Attorney, Agent, or Firm—Depaoli & O'Brien

[57] ABSTRACT

This invention provides α-substituted-vinyl menthyl carbonate esters, and further provides menthol-release oligomeric and polymeric derivatives thereof corresponding to the formula:

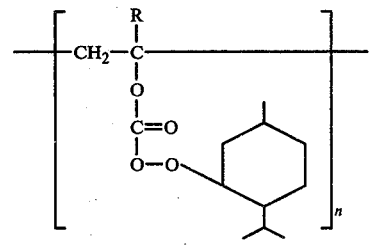

wherein R is a member selected from the group consisting of aliphatic, alicyclic and aromatic hydrocarbon radicals containing between 1 and about 10 carbon atoms, and $n$ is an integer varying between 2 and about 200.

This invention further provides a smoking composition comprising an admixture of tobacco and a polymeric composition as described herein as a menthol-release agent.

7 Claims, No Drawings

α-SUBSTITUTED VINYL MENTHYL CARBONATES

This is a division of application Ser. No. 624,900 filed Oct. 22, 1975, now abandoned.

BACKGROUND OF THE INVENTION

The incorporation of flavorants in tobacco products is an important development in the tobacco industry due to the lowered aromaticity of the available tobacco and to the increased preference of some smokers for filter cigarettes. The addition of certain desirable flavorants to tobacco is limited by their volatility which causes them to be lost or diminished in quantity during processing and storage of the tobacco product. This problem is even more acute for filter cigarettes containing active adsorbent, such as charcoal, in the filters. During the processing and storage of this type of product, volatile flavorants migrate from the tobacco and are irreversibly bound by the active adsorbent, thereby depleting the flavorant in the product and possibly altering the effectiveness of the active adsorbent in its selective removal of undesirable smoke components.

Menthol is a flavorant which has received high acceptance as an additive to tobacco products because of the pleasant cooling effect and desirable aroma and flavor characteristics which it imparts to the smoke. Its high degree of volatility and ease of sublimation have presented problems in the manufacturing operations and, in addition, have resulted in a decreased shelf-life of the product due to losses of menthol by diffusion on storage.

In an attempt to alleviate these problems, it has been suggested that menthol might be adsorbed on a suitable support, such as activated charcoal or fuller's earth, and that the resultant composition might then be added to the tobacco. Attempts to pursue this method have not been satisfactory. The menthol yields from such adsorbents have been found to be very low. Moreover, this method obviously necessitates incorporation of the adsorbent into the tobacco, and such a foreign material can result in an undesirable appearance as well as give rise to uneven burning of the tobacco.

In order to overcome these difficulties, menthol has been incorporated into the tobacco as a part of a compound (i.e., a menthol-release agent) in such form that upon burning of the tobacco, the compound is decomposed to yield the desired menthol flavorant. While considerably more satisfactory than earlier attempts, even this technique has evidenced certain drawbacks.

Bavley et al., U.S. Pat. No. 3,312,226, describes a processs whereby menthol is incorporated into tobacco as the carbonate ester of various alcohols, particularly one such as linalool, which are themselves useful flavorants. Upon pyrolysis of these carbonate esters, incident to the normal burning temperatures of the tobacco, the menthol is released to flavor the smoke. However, these simple carbonate esters have not proven wholly satisfactory. They retain one of the difficulties of menthol itself, in that they are somewhat susceptible to migration in the tobacco, and thereby prevent the strict control of quantitative release of menthol to the tobacco smoke during burning. Additionally, the second alcohol of the carbonate ester can prove susceptible to chemical alteration during pyrolysis, thus giving rise to undesirable chemical fragments which can add a chemical aftertaste to the smoke.

The Mold et al. U.S. Pat. Nos. 3,332,428 and 3,419,543, offer a slightly different approach to the problem of adding menthol flavor to a tobacco smoke. These patents, like that of Bavley et al., rely upon the formation of a carbonate ester to bind the menthol in a release agent. Here, however, a polyhydroxy compound such as monosaccharide, disaccharide, trisaccharide, polysaccharide, or glycol is used to fix the menthol in the tobacco. Again there are certain drawbacks.

Because the alcohol linkages of these saccharides and glycols are only primary or secondary in character, the efficiency with which the menthol can be regenerated upon pyrolysis is limited, owing to the opportunity for dehydration of the menthol moiety. Additionally, where attempts were made to utilize menthol-release agents of high menthol proportion (i.e., agents which would release a high proportion of menthol per unit weight) it was discovered that menthenes were often produced in addition to menthol elimination, thereby resulting in a bitter tasting tobacco smoke.

The Rundberg, Jr. et al. U.S. Pat. No. 3,887,603 describes the development of a new type of menthol-release agent for imparting menthol flavor to tobacco smoke with a high efficiency of menthol-release upon pyrolysis under normal smoking conditions. The menthol-release agent is a polymeric λ-menthyl carbonate ester composition characterized by the presence of a tertiary alcohol ester attachment. Although the said tertiary alcohol moiety renders deesterification as a preferred decomposition mechanism under smoking conditions, there has remained a need for improved menthol-release agents which are conveniently synthesized from readily available starting materials, and which exhibit increased menthol-release efficiency without being deleterious to the flavor of the resultant tobacco smoke.

Accordingly, it is a main object of this invention to provide an improved type of menthol-release agent which is characterized by a substantial lack of mobility and/or volatility at ambient temperatures when incorporated in a tobacco composition.

It is another object of this invention to provide a unique polymeric composition which is adapted to release menthol to tobacco smoke under normal smoking conditions with optimal efficiency and with non-deleterious effect on the flavor of the resultant tobacco smoke.

It is a further object of this invention to provide a novel class of α-substituted-vinyl menthyl carbonate esters, and a method for their preparation from readily available starting material.

Other objects and advantages of the present invention shall become apparent from the following description and examples.

DESCRIPTION OF THE INVENTION

One or more objects of the present invention are accomplished by the provision of a polymeric composition adapted for incorporation in a tobacco composition as a menthol-release agent, said polymeric composition having a molecular weight between about 500 and 30,000 and consisting essentially of recurring monomer units corresponding to the formula:

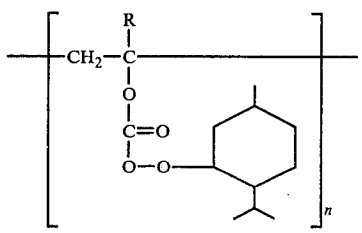

wherein R is a member selected from the group consisting of aliphatic, alicyclic and aromatic hydrocarbon radicals containing between 1 and about 10 carbon atoms, and n is an integer varying between 2 and about 200.

As used herein, the structural representations

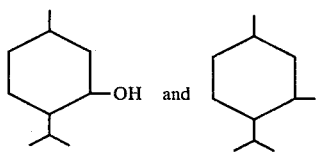

correspond to the chemical formulae of menthol and the menth-1-yl radical respectively:

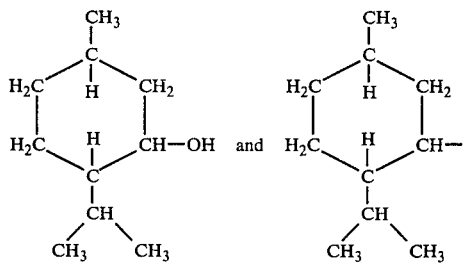

The low molecular weight oligomeric and polymeric menthol-release agents of the present invention, which consist essentially of the recurring monomer units structurally represented hereinabove, are prepared by the polymerization of a novel class of α-substituted-vinyl menthyl carbonate ester compounds having the formula:

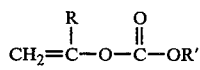

wherein R is a member selected from the group consisting of aliphatic, alicyclic and aromatic hydrocarbon radicals containing between 1 and about 10 carbon atoms, and R' is the menth-1-yl radical.

In the α-substituted-vinyl menthyl carbonate ester formula hereinabove, and the corresponding polymeric compositions derived therefrom, the most preferred of the aliphatic R radicals are those containing between 1 and about 6 carbon atoms, such as methyl, ethyl, propyl, isobutyl, pentyl, and the like. Preferred alicyclic R radicals are those containing between about 3 and 10 carbon atoms, such as cyclopropyl, cyclobutyl, cyclopentyl, cyclohexyl, and the like, and alkyl-substituted derivatives thereof. Preferred aromatic R radicals are those containing between 6 and about 10 carbon atoms such as phenyl, tolyl, xylyl, and the like, and phenylalkyl radicals such as benzyl, phenylethyl, phenylpropyl, and the like. It is highly preferred that the α-substituted R radicals are selected from saturated lower alkyl and phenyl substituents.

As it is apparent, the R radicals described herein can include other elements in addition to hydrogen and carbon, e.g., oxygen and nitrogen. Such elements can be in the structural form of alkoxy, alkyleneoxy, carbonyl, carbalkoxy, epoxy, amino, and the like, and in radical forms of heterocyclic structures such as pyrrole, imidazole, indole, pyridine, pyrazine, piperidine, piperazine, furan, pyran, morpholine, and the like. Preferred radicals of this type include

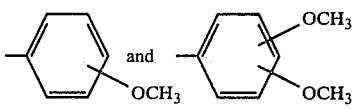

PREPARATION OF CARBONATE ESTER COMPOUNDS

The present invention α-substituted-vinyl menthyl carbonate ester compounds can be synthesized conveniently from readily available starting materials by a method which comprises reacting menthyl haloformate with an enol alcoholate in the following manner:

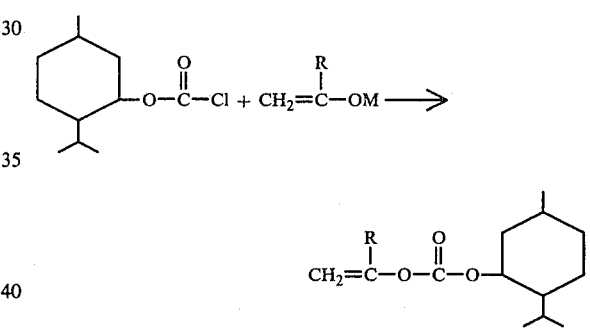

In a preferred synthesis procedure, the enol alcoholate is prepared by reacting a metal hydride (e.g., an alkali metal hydride) with an appropriate R radical substituted methyl ketone in a solvent at 0° C:

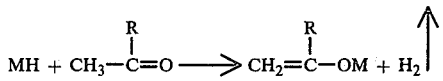

wherein M is an alkali metal.

In a second step, the enol alcoholate so prepared is added dropwise to a cooled solution of menthyl chloroformate. Suitable solvents include benzene, toluene, dioxane, tetrahydrofuran, dimethylformamide, dimethoxyethane, and the like.

The menthyl chloroformate reactant can be prepared by the reaction of menthol and phosgene ($COCl_2$) at a temperature between about 5° C. and 35° C. in a solvent such as benzene. The phosgene is preferably added in substantial molar excess of the menthol, and an appropriate catalyst (e.g., pyridine) can be employed in such an amount as to facilitate the reaction. The reaction mass is stirred for a total of about 3 hours and then allowed to stand overnight. At the end of this time, menthyl chloroformate is recovered as a slightly yellow liquid.

POLYMERIZATION OF CARBONATE ESTER COMPOUNDS

The α-substituted-vinyl menthyl carbonate ester compounds can be converted into the menthol-release oligomeric and polymeric compositions of the present invention employing conventional procedures for vinyl homopolymerization. The polymerization is normally conducted at a temperature in the range between about 20° C. and 100° C. under an inert atmosphere in the presence of a free radical generating catalyst. Suitable catalysts include peroxide compounds such as benzoyl peroxide, cumene hydroperoxide, methyl ethyl ketone peroxide, and the like, azo compounds such as 2,2-azobisisobutyronitrile, and the like, and other known catalyst systems such as trialkylboron and oxygen (trace), trialkylaluminum and oxygen (trace), and the like. Typical polymerization accelerators such as cobalt compounds, sulfur compounds or amine compounds may also be employed in conjunction with the polymerization catalyst.

The present invention menthol-release oligomeric and polymeric compositions can vary over a wide range of molecular weight, but preferably the molecular weight is maintained in the range between about 1500 and 15,000.

Generally, the number of recurring monomeric units will vary between 2 and about 200. For application as menthol-release agents in tobacco compositions, it is preferred that the average number of recurring monomeric units in the polymeric compositions be maintained in the range between about 5 and 50.

SMOKING TOBACCO COMPOSITION

In an important embodiment, the present invention provides a smoking composition which comprises an admixture of natural or reconstituted tobacco and between about 0.1 and 10 weight percent, based on the weight of tobacco, of a menthol-release agent which corresponds to the structural formula set forth hereinabove in definition of the present invention polymers of α-substituted-vinyl menthyl carbonate esters.

The invention menthol-release polymeric composition can be incorporated into the tobacco in accordance with methods known and used in the art. Preferably the menthol-release agent is dissolved in a solvent such as acetone, cyclohexane or dichloromethane and then sprayed or injected into the tobacco matrix. Such method ensures an even distribution of the menthol-release agent throughout the tobacco, and thereby facilitates the production of a more uniform smoking tobacco composition.

In accordance with this invention, there are substantially no losses of menthol through sublimation or volatilization thereof during the manufacturing and storage operations incident to the production of a useful smoking composition. Additionally, the drawbacks of diffusion of menthol, or of a menthol-release agent, within the tobacco are successfully eliminated, and the control of quality and uniformity within the product tobacco compositions is successfully maintained.

Further, the non-menthol residue resultant from the pyrolysis, incident to normal smoking, of a present invention smoking tobacco composition is non-deleterious to the flavor of the tobacco smoke. The present invention menthol-release polymeric composition functions to liberate menthol with optimal efficiency, incident to normal smoking. The present invention menthol-release polymeric compositions contain a maximized weight percent of menthol available for release, thereby permitting the quantity of said menthol-release agent required to be incorporated in a tobacco composition to be minimized.

The following examples are further illustrative of the present invention. The reactants and other specific ingredients are presented as being typical, and various modifications can be derived in view of the foregoing disclosure within the scope of the invention.

EXAMPLE I

Preparation of α-Methylvinyl λ-Menthyl Carbonate

Potassium hydride (0.5 mole, 81.0 g of 24.76% oil dispersion) was washed with anhydrous ethyl ether under nitrogen to remove the oil. After removal of the oil, 400 mls of anhydrous tetrahydrofuran was added and the resulting suspension was stirred and cooled to 0° C. in an ice/salt bath. Acetone (0.5 mole, 29.0 g) was added dropwise to the stirred suspension, such that the reaction temperature did not exceed 5° C. The reaction was complete when hydrogen evolution stopped.

The resulting clear yellow solution was added to λ-menthyl chloroformate (0.48 mole, 104.7 g) in 500 mls of anhydrous tetrahydrofuran with stirring at 0° C. Addition was regulated such that the temperature did not exceed 5° C. After completion of addition, the reaction mixture was stirred for 24 hours at room temperature. The reaction mixture was worked up by adding 1 liter of water and 300 mls of ethyl ether. The first water wash was back-extracted with three 100 ml portions of ethyl ether and all of the ether solutions were combined. The combined ether extracts were washed with four 1 liter portions of water. The ether solution was dried over anhydrous magnesium sulphate for 16 hours. After filtration and solvent evaporation, the resulting oil was distilled through a molecular still at 0.07 mm pressure and at 125° C. A yield of 73.85 g (65.4%) was obtained.

Elemental Analysis: Found: C, 70.03; H, 10.46. Calc: C, 69.96; H, 10.06.

EXAMPLE II

Preparation of α-Styryl λ-Menthyl Carbonate

Potassium hydride (0.095 mole, 15.36 g of a 24.76% oil dispersion) was placed in the upper vessel of a Grignard flask and washed with anhydrous ethyl ether to remove the oil. Freshly distilled dimethoxyethane (200 mls) was added and the resulting suspension was stirred with cooling in an ice/salt bath. Acetophenone (0.10 mole, 12.15 g) was added slowly such that the temperature did not rise above 9° C. The mixture was stirred for 1 hour after completion of addition and then was added slowly to λ-menthyl chloroformate (0.095 mole, 20.8 g) in 100 mls of dimethoxyethane which had been maintained at 4° C. The addition was carried out such that the temperature did not rise above 11° C. The mixture was stirred and allowed to warm to room temperature overnight after completion of addition.

The reaction mixture was poured into 500 mls of water and extracted with three 200 ml portions of ethyl ether. The combined ethyl ether solutions were washed with 250 mls of water and subsequently with four 200 ml portions of water. The ether solution was dried over magnesium sulphate. After filtration and solvent evaporation, the residue obtained was purified by two molecular distillations. The first distillation was carried out at 78° C. and 0.27 mm pressure. The residue obtained (19.35 g) was distilled again at 180° C. and 0.01 mm pressure. A yield of 16.48 g (57.4%) was obtained.

Elemental Analysis: Found: C, 75.15; H, 8.70. Calc: C, 75.46; H, 8.70.

EXAMPLE III

Preparation of Poly($\alpha$-Methylvinyl $\lambda$-Menthyl Carbonate)

$\alpha$-Methylvinyl $\lambda$-menthyl carbonate (71.00 g) was placed in a polymerization apparatus which was previously dried at 105° C. and allowed to cool under a positive pressure of dry nitrogen. Benzoyl peroxide (4.26 g) was added and the monomer/peroxide mixture was stirred with a stream of dry nitrogen introduced under the surface of the monomer for 30 minutes. The nitrogen stream was stopped and the apparatus was placed under a slight positive pressure with dry nitrogen and heated to 75° C. by a thermostated oil bath. The mixture was allowed to polymerize at 75° C. for 72 hours. After polymerization, the sample was allowed to cool to room temperature and a solid mass was obtained. The polymer mass was dissolved in 100 mls of dichloromethane and the solution was added slowly to 1.5 liters of methyl alcohol with vigorous stirring. A fine white precipitate formed and was filtered and dried under reduced pressure (0.05 mm, 72 hours) at room temperature. A yield of 55.33 g of polymer (78.2%) was obtained.

Elemental Analysis:
Found: C, 70.34; H, 10.15. Calc: C, 69.96; H, 10.07.

EXAMPLE IV

Preparation of Poly($\alpha$-Styryl $\lambda$-Menthyl Carbonate)

$\alpha$-Styryl $\lambda$-menthyl carbonate (8.02 g) and benzoyl peroxide (0.40g) were placed in a round bottom flask and stirred with a stream of dry nitrogen introduced under the liquid surface for 3 hours. The nitrogen stream was stopped and the flask was placed under a slight positive pressure with dry nitrogen and was heated to 76° C. The mixture was allowed to polymerize at 76° C. for 72 hours, and then cooled to room temperature. The polymer was dissolved in 13 mls of dichloromethane and the solution was added slowly to 300 mls of methyl alcohol with vigorous stirring. The fine white precipitate which formed was filtered and then dried under reduced pressure (0.05 mm, 16 hours) at room temperature. A yield of 2.31 g of polymer (28.8%) was obtained.

Elemental Analysis: Found: C, 75.62; H, 8.54. Calc: C, 75.46; H, 8.67.

EXAMPLE V

Preparation of a Smoking Composition

A solution of poly($\alpha$-methylvinyl $\lambda$-menthyl carbonate) in cyclohexane was sprayed onto tobacco. The amount of polymer applied was 1.74% of the weight of the tobacco. Cigarette rods (60 mm) were made by machine with treated tobacco weights of 780 mg per cigarette. Active-carbon filters were attached and 52 mm of the rod was consumed by machine smoking the cigarettes in the standard manner of taking 35 ml puffs of 2 seconds duration each minute. Menthol delivery to the mainstream smoke was 0.36 mg with the filter retaining 0.62 mg. The efficiency of the filter in terms of removing gas phase components from the smoke was the same as that obtained when identical filters were used on control cigarette rods which contained no added polymer.

EXAMPLE VI

Preparation of a Smoking Composition

Poly($\alpha$-styryl $\lambda$-menthyl carbonate) was added to tobacco in the same manner as the polymer of Example 5 (2.2% added, based on tobacco weight). Cigarettes (780 mg treated tobacco per cigarette) on smoking produced smoke deliveries of 0.23 mg of menthol per cigarette. Menthol retention in the filters averaged 0.46 mg per cigarette.

EXAMPLE VII

Storage Stability of a Smoking Composition

Cigarettes of Example 6 were carried through two cycles of accelerated aging by placing them in a room maintained at 110° F. and a relative humidity (RH) of 15% for 7 days, and 4 days in a room maintained at 90° F. and 85% Rh, and then repeating the cycle. Analysis of the filters before smoking showed that no menthol had migrated from the tobacco to the filter. On smoking, the menthol delivery to mainstream smoke was 0.24 mg, a value not different from that obtained with unaged cigarettes.

EXAMPLE VIII

Preparation of Smoking Compositions

Tobacco which contained 2.37% poly($\alpha$-methylvinyl $\lambda$-menthyl carbonate) that had been added in cyclohexane solution was made into 85 mm cigarettes which consisted of 65 mm of the treated tobacco and 20 mm of a conventional cellulose acetate filter. The weight of the treated tobacco per cigarette was 820 mg. Smoking 55 mm of the cigarettes in the standard manner yielded 0.44 mg of menthol in mainstream smoke. The filter retained 0.97 mg of menthol.

In the same manner, cigarettes were prepared with 1.7% of the polymer added to the tobacco, and yielded 0.24 mg of menthol to the smoke and 0.60 mg to the filter when smoked in the standard manner.

EXAMPLE IX

Preparation of $\alpha$-Cyclopropylvinyl $\lambda$-Menthyl Carbonate

Potassium hydride (0.20 mol, 32.4 g of a 24.76% oil dispersion) was washed with anhydrous ethyl ether to remove the oil. After removal of the oil, 300 mls of anhydrous tetrahydrofuran was added and the resulting suspension was stirred and cooled to 0° C. in an ice/salt bath. Cyclopropyl methyl ketone (0.20 mol, 16.81 g) was added dropwise to the stirred suspension such that the reaction temperature did not exceed 3° C. The reaction was complete when hydrogen evolution stopped.

The resulting clear yellow solution was added to $\lambda$-menthyl chloroformate (0.18 mol, 38.7 g) in 400 mls of anhydrous tetrahydrofuran with stirring at 0° C. Addition was regulated such that the temperature did not exceed 3° C. After completion of the addition, the reaction mixture was stirred for 16 hours at room temperature. The reaction mixture was worked up by adding 400 mls of water and 400 mls of ethyl ether. The ether solution was dried over magnesium sulphate for 16 hours. After filtration and solvent evaporation, a yellow slurry was obtained. Methyl alcohol (200 mls) was added and the resulting suspension was cooled with stirring in an ice-water bath. The suspension was filtered, and the methyl alcohol solution obtained was evaporated to yield 36.0 g (72%) of yellow oil. An infrared spectrum provided the following support of structure:

| Functionality | Band Position |
|---|---|
| $H_2C=C-O-\overset{O}{\underset{\|}{C}}-O-$ | 1770 cm$^{-1}$<br>1665 cm$^{-1}$<br>1250 cm$^{-1}$ |
| $H_2C\overset{CH_2}{\underset{\diagdown}{\diagup}}CH-$ | 3100 cm$^{-1}$<br>3020 cm$^{-1}$ |
| $H_3C\diagdown\phantom{CH}\diagup H_3C$ CH— | 1392 cm$^{-1}$<br>1376 cm$^{-1}$ |

EXAMPLE X

Preparation of Poly(α-Cyclopropylvinyl λ-Menthyl Carbonate)

α-Cyclopropylvinyl λ-methyl carbonate (6.0 g) from Example IX was fractionated and a center cut (b.p. 85°–90° C./0.11 mm) of 1.97 g was obtained. A charge of 1.26 g of the monomer was placed in a polymerization apparatus which was previously dried at 105° C. and cooled under a positive pressure of dry nitrogen. Benzoyl peroxide (75.6 mg) was added and the monomer/peroxide mixture was stirred with a stream of dry nitrogen introduced under the surface of the monomer for 30 minutes. The nitrogen stream was stopped and the apparatus was placed under a slight positive pressure with dry nitrogen and heated to 75° C.

The mixture was allowed to polymerize at 75° C. for 72 hours. After 72 hours, the mixture was cooled to room temperature at which time a gel was obtained. The polymer mass was dissolved in 2.5 mls of methylene chloride and added slowly to 25 mls of methyl alcohol cooled in a dry ice/2-propanol slush. A finely divided white precipitate was formed which agglomerated on warming to room temperature. The precipitation was repeated for two additional cycles. The solid polymer obtained after final filtration was dried under reduced pressure (0.05 mm, 72 hours) at room temperature. A yield of 0.67 g (53%) of a glassy solid, which possessed no odor of menthol but which released the odor of menthol on heating, was obtained.

Elemental Analysis: Found: C, 72.08; H, 9.75. Calc: C, 72.14; H, 9.84.

EXAMPLE XI

Preparation of 3,3-Dimethylbut-1-en-2-yl λ-Menthyl Carbonate

To a suspension of 4.01 g (0.10 mol) of potassium hydride in 200 ml of freshly distilled tetrahydrofuran, cooled to 5° C. and stirred, 10.16 g (0.10 mol) of 3,3-dimethylbutan-2-one was added dropwise. Hydrogen gas was evolved rapidly, and the gray suspension became a yellow solution. Stirring was continued for 5 minutes after addition. Then the entire reaction mixture was added slowly with stirring to 20.8 g (0.095 mol) of menthyl chloroformate in 200 mls of tetrahydrofuran. Addition was carried out at a rate which allowed the temperature to remain below 10° C. After completion of the addition, the reaction mixture was stirred for 24 hours and allowed to warm slowly to ambient temperature.

The reaction mixture was poured into a mixture of 500 mls of water and 500 mls of ether. Phases were separated after equilibration. The aqueous phase had a pH of 7. The ether layer was extracted with four 500 ml portions of water, and was subsequently dried over magnesium sulfate. Removal of solvent under reduced pressure left a residue weighing 26.71 g. An aliquot weighing 11.00 g was distilled through a short-path microware still.

| Fraction | B.P. (° C) | P(mm) | Weight(g) |
|---|---|---|---|
| 1 | 61° | 0.08 | 1.10 |
| 2 | 90°–100° | 0.15–0.13 | 6.50 |
| 3 | 95°–100° | 0.13–0.14 | 1.06 |
| Residue | | | 1.90 |
| | | Total | 10.56 |

On this basis, the total yield of the carbonate was calculated to be 21.03 g (0.075 mol, 78.4%).

Elemental Analysis: Found: C, 72.47; H, 10.72. Calc: C, 72.30; H, 10.71.

EXAMPLE XII

Preparation of Poly(3,3-Dimethylbut-1-en-2-yl Menthyl Carbonate)

3,3-Dimethylbut-1-en-2-yl menthyl carbonate (3.0 g) and benzoyl peroxide (0.150 g) were degassed with a stream of nitrogen, and then heated to 75° C. for 5 days. After cooling, the reaction mixture was dissolved in methylene chloride, and the methylene chloride solution was added to 25 ml of methanol, producing a tacky gum. The tacky gum was redissolved in 4 mls of methylene chloride and 2 mls of isopropyl alcohol. The solution was added to 20 mls of methanol at −78° C. The resulting white precipitate was removed by vacuum filtration. Drying under vacuum yielded 0.85 g (28.3%) of odorless poly(3,3-dimethylbut-1-en-3-yl menthyl carbonate), which was determined by osmometry to have a molecular weight of 1220. When heated, the odor of menthol was evident.

EXAMPLE XIII

Comparison of Menthol-release Pyrolysis Data

A present invention composition, poly(α-styryl λ-menthyl carbonate), and poly(1,1-dimethylallyl λ-menthyl carbonate) in accordance with Rundberg et al. (U.S. Pat. No. 3,887,603), were subjected to pyrolysis conditions to compare the menthol-release properties of the two compositions.

Each composition was pyrolyzed in a quartz-tube with a helium flow to carry the pyrolysis products into a gas chromatographic analysis system.

| Polymer | Temperature of Maximum Release (° C) | Percentage of Theoretically Available Menthol Released |
|---|---|---|
| Poly(α-styryl menthyl carbonate) | 200° | 90% |
| Poly(dimethyl allyl l-menthyl carbonate) | 350° | 83.8% |

A comparison of results indicated that the present invention composition released a higher percentage of λ-menthol flavorant at a lower temperature than the Rundberg et al composition.

In the present invention, the term "menthol" is meant to include all of the stereoisomeric forms of menthol, taken singly or in admixture, which are known and used in the art as flavorants. λ-Menthol is the preferred stereoisomeric form of menthol flavorant.

What is claimed is:

1. A chemical compound corresponding to the formula:

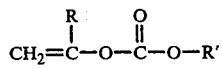

wherein R is a member selected from the group consisting of aliphatic, alicyclic and aromatic radicals containing between 1 and about 10 carbon atoms and composed of elements selected from carbon, hydrogen and oxygen, and R' is the menth-1-yl radical.

2. A chemical compound in accordance with claim 1 wherein the R radical is methyl.

3. A chemical compound in accordance with claim 1 wherein the R radical is phenyl.

4. A chemical compound in accordance with claim 1 wherein the R radical is cyclopropyl.

5. A chemical compound in accordance with claim 1 wherein the R radical is tertiary-butyl.

6. A chemical compound in accordance with claim 1 wherein the R radical is

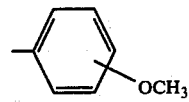

7. A chemical compound in accordance with claim 1 wherein the R radical is

* * * * *

UNITED STATES PATENT OFFICE
CERTIFICATE OF CORRECTION

Patent No. 4,127,601            Dated November 28, 1978

Inventor(s) Harvey J. Grubbs et al

It is certified that error appears in the above-identified patent and that said Letters Patent are hereby corrected as shown below:

Page 1, under U.S. PATENT DOCUMENTS, "Bauley et al" should read --Bavley et al--.

Page 1, under ABSTRACT, the formula should not contain a peroxy group in the carbonate ester structure.

Column 2, line 29, and in every subsequent occurrence, "$\lambda$-menthyl" should read --$\ell$-menthyl--.

Column 3, the first formula should not contain a peroxy group in the carbonate ester structure.

Column 8, line 21, "Rh" should read --RH--.

Column 10, line 31, "to 75°C" should read --at 75°C--.

Signed and Sealed this

Eighth Day of May 1979

[SEAL]

Attest:

RUTH C. MASON
Attesting Officer

DONALD W. BANNER
Commissioner of Patents and Trademarks